Figure 1:
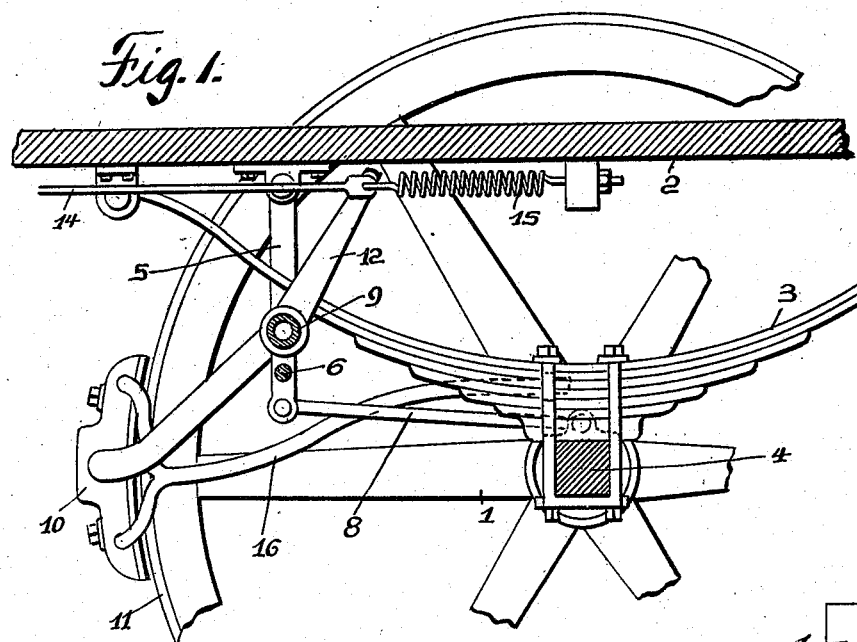

No. 847,865. PATENTED MAR. 19, 1907.
F. W. WERNKE.
WAGON BRAKE.
APPLICATION FILED SEPT. 25, 1906.

Witnesses:
C. Kostermann
J. H. Butler

Inventor.
Frederick W. Wernke.

By N. C. Evert & Co.
Attorneys

UNITED STATES PATENT OFFICE.

FREDERICK W. WERNKE, OF McKEESPORT, PENNSYLVANIA.

WAGON-BRAKE.

No. 847,865.        Specification of Letters Patent.        Patented March 19, 1907.

Application filed September 25, 1906. Serial No. 336,206.

*To all whom it may concern:*

Be it known that I, FREDERICK W. WERNKE, a citizen of the United States of America, residing at McKeesport, in the county of Allegheny and State of Pennsylvania, have invented certain new and useful Improvements in Wagon-Brakes, of which the following is a specification, reference being had therein to the accompanying drawing.

This invention relates to certain new and useful improvements in wagon-brakes; and the invention has for its primary object the provision of novel means for easily and quickly applying the brake-shoes of a vehicle to the wheels thereof.

Another object of this invention is to provide a simple and inexpensive brake mechanism for insuring a positive application of the brakes, said mechanism being constructed whereby two distinct pressures upon different lines will be exerted upon a brake-shoe when gripping a wheel.

A further object of this invention is to provide a braking mechanism for a vehicle which will be positive in its action, inexpensive to maintain, and free from all danger of being injured by ordinary use.

With these and other objects in view, which will more readily appear as the invention is better understood, the same consists in the novel construction, combination, and arrangement of parts to be hereinafter more fully described and then specifically pointed out in the appended claims.

Referring to the drawing forming part of this specification, like numerals of reference designate corresponding parts throughout the several views, in which—

Figure 2:
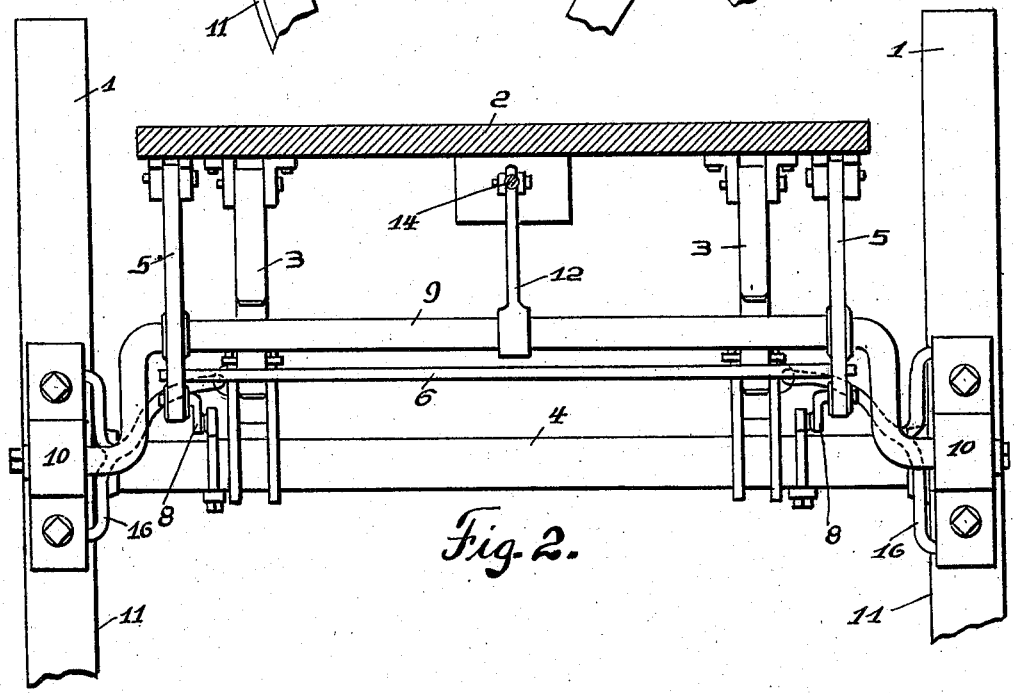

Figure 1 is a fragmentary longitudinal sectional view of a vehicle equipped with my improved brake; and Fig. 2 is a cross-sectional view of the same, illustrating the brake thereof in elevation.

In the accompanying drawing I have illustrated the rear wheel 1 of a vehicle, the body 2 of said vehicle being supported by springs 3 from the axle 4, upon which the wheels 1 are journaled.

My invention resides in providing the body 2 of the vehicle with two pivoted hangers 5, said hangers being arranged at each side of the body 2 of the vehicle. The hangers are connected, near their lower ends, by a rod 6, and their extreme ends are pivotally connected to the axle 4 by links 8.

In the hangers is journaled a brake-beam 9, carrying brake-shoes 10 upon its ends, adapted to engage the tires or peripheries 11 of the wheels 1. The brake-beam 9 intermediate its ends is provided with a crank-arm 12, which connects with a brake-rod 14, that extends forwardly beneath the body 2 of the vehicle to a convenient place to be actuated by the driver or operator thereof. The crank-arm 12 is also connected to a coil-spring 15, suitably secured to the body 2 of the vehicle, said spring being adapted to normally maintain the brake-shoes in a disengaged position relative to the wheels of the vehicle.

When my improved brake mechanism is in operation, a forward movement of the brake-rod 14 causes the brake-shoes 10 to swing downwardly and engage the wheels 1 of the vehicle. This movement of the brake-rod 14, together with the vibratory movement which exists between the body 2 of the vehicle and the springs 3, causes the hangers 5 to swing rearwardly, and this movement of the hangers tends to exert a radial pressure of the brake-shoes 10 upon the wheel 1. This last pressure is accomplished by having the lower end of the hangers 5 connected indirectly to the axle 4 of the wheels 1, this feature constituting an important adjunct to almost any type of brake mechanism.

In connection with my improved brake mechanism I have illustrated a guide and bearing-rod 16, which serves to steady the brake-shoes 10 when applied to the vehicle-wheels.

My invention particularly resides in the pivoted hangers 5 and the links 8, which through the medium of the movement of the rear brake of the vehicle irrespective of the vehicle-body which it supports causes a greater pressure to be exerted upon the wheels of the vehicle by the brake-shoes. In other words, I have devised a braking mechanism for moving the brake-shoes in two directions and exerting two distinct pressures upon the wheels of a vehicle.

My improved brake mechanism is constructed of strong and durable metal, and while I have herein illustrated the preferred arrangement of the brake mechanism it is obvious that the same may be constructed whereby the principle of my invention will be applicable to various types of vehicles. Such other changes in the minor details of construction as are permissible by the appended claims may be resorted to without departing from the spirit and scope of the invention.

What I claim, and desire to secure by Letters Patent, is—

1. In a vehicle-brake, the combination with a vehicle-body, the axle, and the wheels, of a pair of hangers pivotally suspended at their upper ends from the vehicle-body, a rod connecting said hangers near their lower ends, a brake-beam mounted in the hangers between said rod and the upper ends of the hangers, brake-shoes carried on cranked ends of said brake-beam to engage the wheels, links connected to the lower ends of said hangers and to the vehicle-axle, an arm connected to the brake-beam intermediate its cranked ends, a brake-rod connected to said arm and extending forwardly of the vehicle-body, and a spring also connected to said arm and extending rearwardly of the vehicle-body, with its rear end connected to said body.

2. In a vehicle-brake, the combination with a vehicle-body, the axle, and the wheels, of a pair of hangers pivotally suspended at their upper ends from the vehicle-body, a rod connecting said hangers near their lower ends, a brake-beam mounted in the hangers between said rod and the upper ends of the hangers, brake-shoes carried on cranked ends of said brake-beam to engage the wheels, links connected to the lower ends of said hangers and to the vehicle-axle, an arm connected to the brake-beam intermediate its cranked ends, a brake-rod connected to said arm and extending forwardly of the vehicle-body, a spring also connected to said arm and extending rearwardly of the vehicle-body with its rear end connected to said body, and a guide and bearing-rod for each brake-shoe attached to said shoes near their upper and lower ends respectively.

In testimony whereof I affix my signature in the presence of two witnesses.

FREDERICK W. WERNKE.

Witnesses:
C. VELOSTERMANN,
MAX H. SROLOVITZ.